(12) United States Patent
Nakayama et al.

(10) Patent No.: US 6,600,832 B1
(45) Date of Patent: Jul. 29, 2003

(54) IMAGE PROCESSING METHOD AND IMAGE PROCESSING APPARATUS INCLUDING REPLACING COLOR IMAGE INPUT DATA WITH ACHROMATIC COLOR DATA

(75) Inventors: Yuri Nakayama, Higashiosaka (JP); Toshihiro Kanata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/525,876

(22) Filed: Mar. 14, 2000

(30) Foreign Application Priority Data

Apr. 30, 1999 (JP) .............................. 11-124866

(51) Int. Cl.[7] .............................. G06K 9/00; G06K 9/48; H04N 1/40; H04N 3/08
(52) U.S. Cl. ..................... 382/162; 382/199; 382/167; 358/462; 358/518; 358/538
(58) Field of Search ................................ 382/162, 165, 382/167, 199, 254; 358/462, 538, 448, 518, 520, 521, 529, 530

(56) References Cited

U.S. PATENT DOCUMENTS 4,831,409 A  *  5/1989  Tatara et al. ................. 358/300
5,032,903 A  *  7/1991  Suzuki et al. ................. 358/530
5,410,619 A  *  4/1995  Fujisawa et al. ............. 382/254
5,844,688 A  * 12/1998  Shimizu et al. ............. 358/296
6,118,550 A  *  9/2000  Hayashi ....................... 358/296

FOREIGN PATENT DOCUMENTS

JP           09139843           5/1997

* cited by examiner

*Primary Examiner*—Andrew W. Johns
*Assistant Examiner*—Amir Alavi
(74) *Attorney, Agent, or Firm*—Renner, Otto, Boisselle & Sklar

(57) ABSTRACT

An edge detection/color determination portion detects edges using a Sobel filter and makes color determination, to output a black edge judgment signal. A characteristic quantity calculation/judgment portion calculates characteristic quantities inside a mask including an observed pixel and judges based on the result whether the observed pixel is of a character edge, to thereby output a character edge judgment signal. An AND circuit produces a logical product between the two signals and outputs it as a black character edge judgment signal. Further, an emphasis setup judgment portion judges whether the emphasis process will produce white voids and contours around characters and outputs the judgment as an emphasis setup judgment signal.

6 Claims, 14 Drawing Sheets

Observed pixel

| 1 | 2 | 1 |
|---|---|---|
| 0 | 0 | 0 |
| -1 | -2 | -1 |

| 1 | 0 | -1 |
|---|---|---|
| 2 | 0 | -2 |
| 1 | 0 | -1 |

FIG. 13A
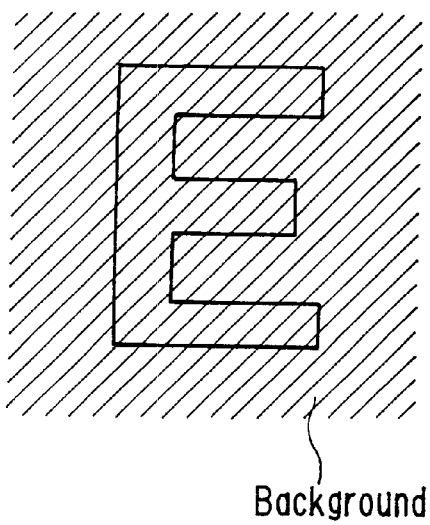
Background
FIG. 13B
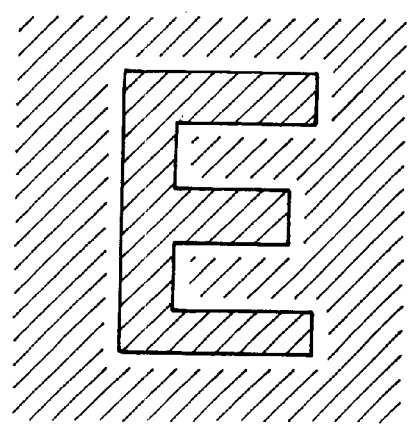
FIG. 14
| -1/4 | 0 | 0 | 0 | -1/4 |
|---|---|---|---|---|
| 0 | 0 | 0 | 0 | 0 |
| 0 | 0 | 1 | 0 | 0 |
| 0 | 0 | 0 | 0 | 0 |
| -1/4 | 0 | 0 | 0 | -1/4 |

Character area
density value

Density value resulting from
an emphasis judgment filter

IMAGE PROCESSING METHOD AND IMAGE PROCESSING APPARATUS INCLUDING REPLACING COLOR IMAGE INPUT DATA WITH ACHROMATIC COLOR DATA

BACKGROUND OF THE INVENTION

1. Field of the Invention

The present invention relates to an image processing method and an image processing apparatus for use in a digital color copier, facsimile machine, etc., in particular relating to an image processing method and an image processing apparatus wherein black character areas in an image are detected so that the image is processed in an appropriate manner based on the detected result.

2. Description of the Prior Art

In recent years, digital color copiers and color laser printers have widely spread because of rapid development of OA apparatus into digitalization and increase of the demands for color image output. In order to realize high quality imaging and high performance functions with these image forming apparatus, image processing techniques play an important role. In a digital color copier, a color original is captured by separating it into three colors, R(red), G(green) and B(blue), and the captured data is subjected to various image processes so as to produce a converted set of image data of four colors, C(cyan), M(magenta), Y(yellow) and K(black), which in turn is used to form a color image on a recording medium. Here, the reason the K signal is added is that if reproduction of achromatic colors such as black and the like is tried by superimposition of the three colors, C, M and Y, color turbidness and color misregistration will occur.

In order to improve against these drawbacks, black generation and undercolor removal(UCR) are executed. However, even with these processes, it is not possible to execute a perfect undercolor removal, so the black characters cannot be reproduced to be black and also color blurring will occur around the black characters. In order to improve against these drawbacks, there have been proposals for improving image quality by detecting black character areas in originals and subjecting those areas to a treatment for enhancing the reproducibility of characters, such as emphasis filtering, black emphasis, and the like. For example, Japanese Patent Application Laid-Open Hei 9 No. 139843, discloses an image processing apparatus in which edges of black characters are detected from image data of an original composed of chromatic and achromatic color components, outer portions with respect to the edges are distinguished from inner portions and the data values of the chromatic and achromatic color components of pixels determined as belonging to outer edge portions and the data values of the chromatic color component of pixels determined as belonging to inner edge portions are replaced with minimum values from among the individual observed pixels and their surrounding pixels while the pixels determined as within inner edge portions are edge emphasized, that is, the data value of the achromatic color component of the pixels are enhanced.

In the above prior art, inner and outer sides with respect to edges are determined so that the data values of the areas on the outer side are replaced with predetermined minimum values while only the areas on the inner side are edge emphasized to thereby avoid occurrence of white voids around characters and thickening of black characters. However, there is a good chance of color blurring around black characters when the data values of observed pixels are replaced with predetermined minimum values with a risk of fine characters and thin lines being deleted. Further, in this prior art, since each pixel is determined to belong to either the inner side or the outer side with respect to an edge, based on whether the coefficient of the second-derivative filter is positive or negative, there is a possibility that the density of pixels which have been determined to reside inside an edge might become lower than the background density by an emphasis filtering process, thus possibly generating contours around characters. Therefore, the method of discriminating the inner portions from the outer portions and subjecting them to different processes will encounter drawbacks in that small characters and fine lines may be deleted, color blurring and contours may arise around characters and the image quality may become lowered.

SUMMARY OF THE INVENTION

The present invention has been devised in view of the above problems and it is therefore an object of the present invention to provide an image processing method and an image processing apparatus wherein not only the occurrence of white voids but also the occurrence of contours, color blurring, which all would arise around black characters, can be avoided.

In order to achieve the above object, the present invention is configured as follows:

In accordance with the first aspect of the present invention, an image processing method, comprises the steps of:

subjecting a plurality of color components constituting color image input data to an emphasis judgment filtering process;

comparing each result with a corresponding predetermined reference value and summing the compared results;

comparing the sum with a predetermined threshold;

judging whether an emphasis process is effected for the color image input data based on the comparison; and replacing the color image input data with achromatic color data when the judgment determines that the emphasis process should not be effected.

In accordance with the second aspect of the present invention, the image processing method having the above first feature is characterized in that the achromatic color data is the mean value of the multiple color components of the color image input data.

In accordance with the third aspect of the present invention, the image processing method having the above first feature is characterized in that the reference value is determined based on the background data of the color image input data.

In accordance with the fourth aspect of the present invention, an image processing apparatus at least having an edge detecting means for detecting edges of black characters based on color image input data, comprises:

an emphasis judgment filtering means for subjecting a plurality of color components constituting color image input data to an emphasis judgment filtering process;

a comparing means for comparing the result as to each color component output from the emphasis judgment filtering means, with a corresponding predetermined reference value;

a signal generating means for generating an emphasis setup judgment signal based on the result from the comparing means; and, a signal replacing means for replacing the color image input data with achromatic color data when the judgment determines that the emphasis process should not be effected.

In accordance with the fifth aspect of the present invention, the image processing apparatus having the above fourth feature is characterized in that the signal replacing means calculates the mean value of the multiple color components of the color image input data to produce achromatic color data and replaces the color image input data with the achromatic color data.

In accordance with the sixth aspect of the present invention, the image processing apparatus having the above fourth feature is characterized in that the reference values set up in the comparing means are determined based on the background information of the color image input data.

In the method written as the first feature, first, each of the color components of the color image input data is subjected to an emphasis judgment filtering process, and the result is compared to a predetermined reference value, for example, with reference to the sign of the resultant value, i.e., checking if the value is positive or negative, or the background data (the value of the background density), or the like. An area of pixels having negative values after the emphasis judgment filtering process can produce white voids around characters. An area of pixels having values smaller than the background density value can produce contours around characters. The effect of the above process enables previous detection of these defects.

Then, the comparison results for individual color components are summed and the sum is compared to a predetermined threshold so as to determine whether an emphasis process is to be effected. When the judgment determines that the emphasis process should not be effected, the color image input data is replaced with achromatic color data.

Since color blurring often occurs at black character edges, replacement of the data of the areas, for which the emphasis process should not be effected, with data close to black (achromatic color) enables prevention of color blurring as well as avoidance of the disappearance of small characters and fine lines.

In the method written as the second feature, when it is determined that no emphasis process should be effected, from the judgment as to whether the emphasis process is to be done, the mean value of the multiple color components of the color image input data is used as the achromatic color data to replace the color image input data. For example, when the color image input data is of C, M and Y, the mean value of C, M and Y is calculated to replace each of the C, M and Y values. Thus, replacement of the C, M and Y component values with their average enables neutralization of the density differences between C, M and Y color components and generation of data close to an achromatic color. In this way, it is possible to generate achromatic color data in a simple method.

In the method written as the third feature, when each of the color components of the color image input data is subjected to an emphasis judgment filtering process and the result is compared to a predetermined reference value, the background data (the background density value) is used as the reference value. An area of pixels having negative values after the emphasis judgment filtering process can cause white voids around characters. An area of pixels having values smaller than the background density value, even if they are positive, can produce contours around characters if uniform emphasis is effected. For countermeasures against these drawbacks, use of the background data of the color image input data as the reference value makes it possible to exclude the areas which could produce such contours and hence effect appropriate emphasis filtering process for black character edges.

In the configuration written as the fourth feature, first the emphasis judgment filtering means subjects each of the color components of the color image input data to an emphasis judgment filtering process, and the comparing means compares the result with a predetermined reference value, for example, with reference to the sign of the resultant value, i.e., checking if the value is positive or negative, or the background data (the value of the background density), or the like. An area of pixels having negative values after the emphasis judgment filtering process can produce white voids around characters. An area of pixels having values smaller than the background density value can produce contours around characters. The effect of the above process enables previous detection of these defects.

Then, the comparison results for individual color components output from the comparing means are summed and the sum is compared to a predetermined threshold so as to determine whether an emphasis process is to be effected. The signal generating means generates an emphasis setup judgment signal. The signal converting means replaces the color image input data with achromatic color data when it is judged from the emphasis setup signal that the emphasis process should not be effected.

Since color blurring often occurs at black character edges, replacement by signal converting means of the data of the areas, for which the emphasis process should not be effected, with data close to black (achromatic color) enables prevention of color blurring as well as avoidance of the disappearance of small characters and fine lines.

In the configuration written as the fifth feature, when the color image input data is subjected to an emphasis judgment filtering process by the emphasis judgment filtering means and it is determined that no, emphasis process should be effected, the signal converting means calculates the mean value of the values of the multiple color components of the color image input data and replaces each of the color component values with that mean value. Thus, replacement of the multiple color values with their mean value enables neutralization of the density differences between the individual color components and generation of data close to an achromatic color. In this way, it is possible to generate achromatic color data in a simple method.

In the configuration written as the sixth feature, when each of the color components of the color image input data is subjected to an emphasis judgment filtering process by the emphasis judgment filtering means and the result is compared to a predetermined reference value, set beforehand in the comparing means. In this configuration, the background data (the background density value) is used as the reference value. An area of pixels having negative values after the emphasis judgment filtering process may cause white voids around characters. An area of pixels having values smaller than the background density value, even if they are positive, can also produce contours around characters if uniform emphasis is effected. For countermeasures against these drawbacks, use of the background data of the color image input data as the reference value makes it possible to exclude the areas which could produce such contours and hence effect appropriate emphasis filtering process for black character edges.

BRIEF DESCRIPTION OF THE DRAWINGS

FIG. 13A is a schematic view showing edges of a black character in a background of a lower density, FIG. 13B is a schematic view for illustrating contours arising around characters when edges of the character shown in FIG. 13A are totally processed with an emphasis filter;

FIG. 14 is an example of an emphasis judgment filter applied to an emphasis setup judgment portion;

DESCRIPTION OF THE PREFERRED EMBODIMENTS

The embodiment of the present invention will hereinafter be described in detail with reference to the accompanying drawings.

Figure 1:
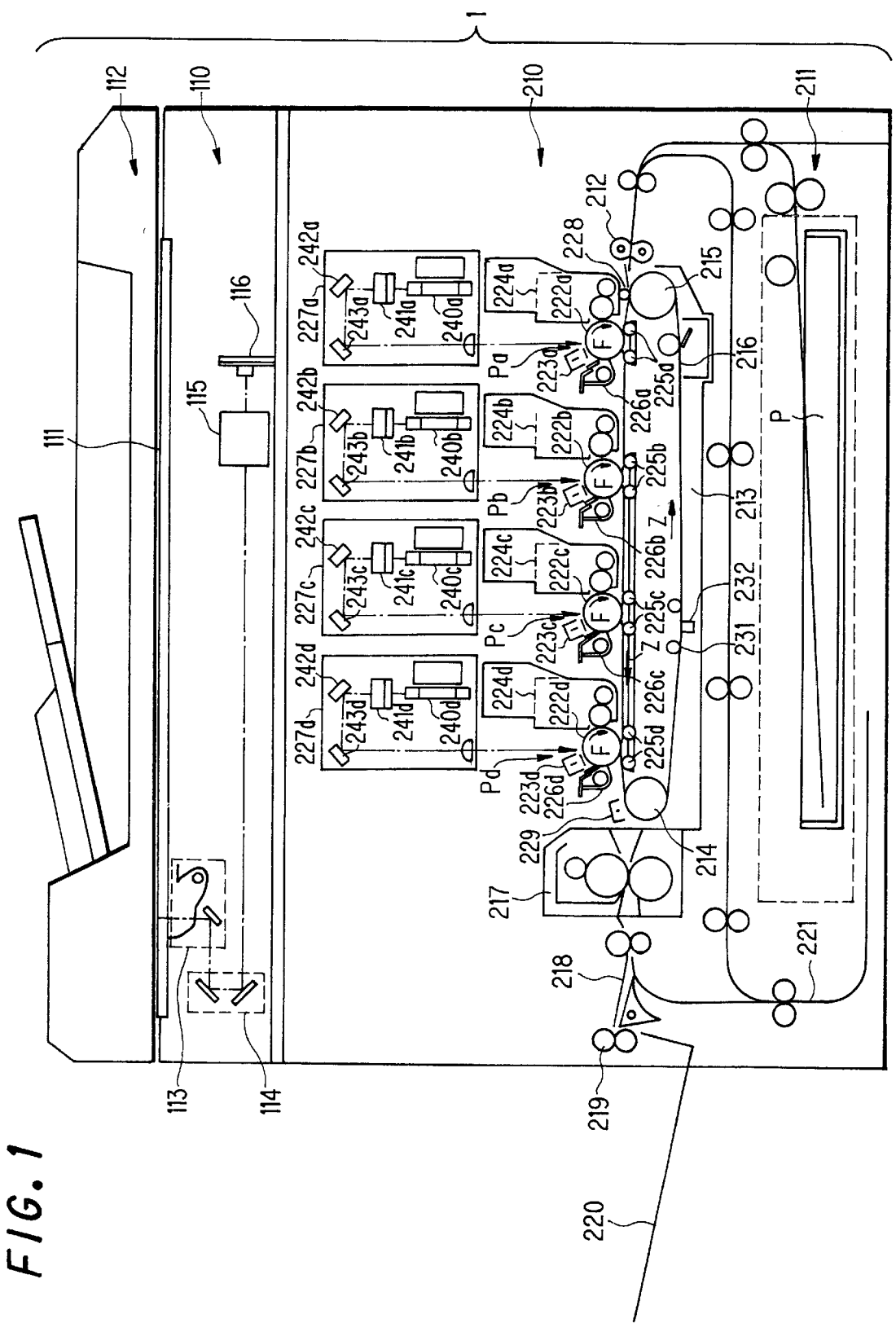
FIG. 1 is a front sectional view showing a configuration of a digital color image forming apparatus in accordance with the embodiment of the present invention.

FIG. 1 is a front sectional view showing an overall configuration of a digital color copier image forming apparatus 1 according to the present invention. This image forming apparatus body 1 has an original table 111 and an unillustrated control panel on the top thereof and has an image input portion 110 and an image output unit 210 within.

A reversing automatic document feeder (RADF) 112 is arranged on the top surface of original table 111 in the predetermined position with resect to the original table 111 surface, whilst being supported so as to be opened and closed relative to original table 111.

RADF 112, first, conveys an original so that the one side of the original opposes image input portion 110 at the predetermined position on original table 111. After the image scanning of this side is completed, the original is inverted and conveyed to original table 111 so that the other side opposes image input portion 110 at the predetermined position on original table 111. Then, when RADF 112 completes image scanning of both sides of one original, this original is discharged and the duplex copy conveying operation for a next document is effected. The operation of the conveyance and face inversion of the original is controlled in association with the whole operation of the image forming apparatus.

Image input portion 110 is disposed below original table 111 in order to read the image of the original conveyed onto original table 111 by means of RADF112. Image input portion 110 is configured of a scanner that includes original scanning portion 113 and 114 which reciprocates along, and in parallel to, the undersurface of original table 111, an optical lens 115 and a CCD (charge coupled device) line sensor 116 as a photoelectric converting device.

This original scanning portion 113 and 114 is composed of first and second scanner units 113 and 114. First scanner unit 113 has an exposure lamp for illuminating the original image surface and a first mirror for deflecting the reflection image of light from the original in the predetermined direction and moves in a reciprocating manner in parallel with, whilst being kept a certain distance away from, the undersurface of original table 111 at the predetermined speed. Second scanner unit 114 has second and third mirrors which deflect the reflected light image from the original, deflected by first mirror of first scanner unit 113, in the predetermined direction and moves in a reciprocating manner, at a speed related to that of first scanner unit 113 and in parallel thereto.

Optical lens 115 reduces the reflected light image from the original, thus deflected by third mirror of second scanner unit 114, so that the reduced light image will be focused on the predetermined position on CCD line sensor 116.

Figure 2:
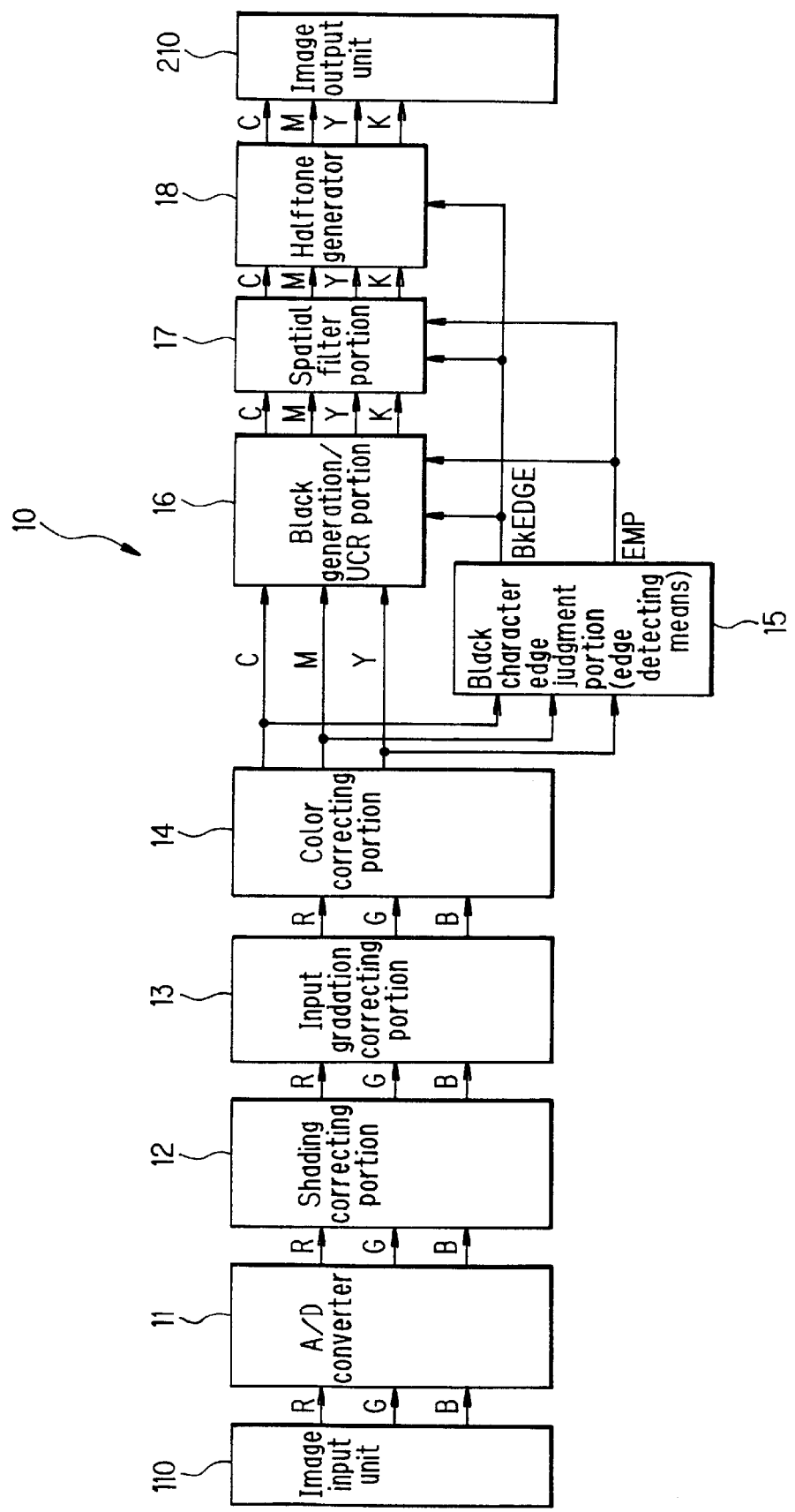
FIG. 2 is a block diagram showing an image processing apparatus used in a digital color image forming apparatus.

CCD line sensor 116 photoelectrically converts the focused light image, line by line, into an electric signal and outputs it. CCD line sensor 116 is a three-line color CCD which can read monochrome and color images and output line data as to color separation components R(red), G(green) and B(blue). The original image information thus obtained as the electric signal from this CCD line sensor 116 is further transferred to an aftermentioned image processor 10 (c.f. FIG. 2) where the predetermined image data processes are performed.

Next, the configuration of image output unit 210 and the configuration of the components related to image output portion 210 will be described.

Provided below image output portion 210 is a paper feeding mechanism 211 which separates a sheet of paper (recording medium) P, one by one, from a stack of paper held in a paper feed cassette and feeds it toward image output portion 210. The paper P thus separated and fed sheet by sheet is delivered into image output portion 210 with its timing controlled by a pair of registration rollers 212 located before image output portion 210. The paper P with an image formed on its one side is conveyed and re-fed to image output portion 210 in time with image forming of image output portion 210.

Arranged under image output portion 210 is a conveyer and transfer belt mechanism 213. Conveyer and transfer belt mechanism 213 is composed of a driving roller 214, an idle roller 215 and a conveyer and transfer belt 216 wound and tensioned in parallel between the two rollers so as to convey paper P being attracted to the belt by electrostatic force. Further, a pattern image detecting unit 232 is provided under and in proximity to conveyer and transfer belt 216.

Arranged in the paper conveyance path, downstream of conveyer and transfer belt mechanism 213 is a fixing unit 217 for fixing the toner image transferred to paper P onto paper P. Paper P having passed through the nip between a pair of fixing rollers of fixing unit 217 passes through a conveyance direction switching gate 218 and is discharged by discharge rollers 219 to a paper output tray 220 attached to the outer wall of image forming apparatus body 1. This switching gate 218 selectively connects the conveyance path of paper P after fixing with either the path to discharge paper P to the outside of image forming apparatus body 1 or the path to recirculate paper P toward image output portion 210. The paper P which is designated to be conveyed again to image output portion 210 by means of switching gate 218 is face-inverted by means of a switch-back conveyance path 221 and then re-fed to image output portion 210.

Arranged above, and in proximity to, conveyer and transfer belt 216 in image output portion 210 are the first image forming station Pa, the second image forming station Pb, the third image forming station Pc and the fourth image forming station Pd, in the above mentioned order from the upstream side of the paper conveyance path.

Conveyer and transfer roller 216 is driven by driving roller 214 in the direction indicated by arrow Z in FIG. 1, and carries paper P which is fed by paper feeding mechanism 211 as stated above and sequentially conveys it to image forming stations Pa to Pd.

All the image forming stations Pa to Pd are of a substantially identical configuration. Each image forming station Pa, Pb, Pc and Pd has a photosensitive drum 222a, 222b, 222c and 222d, which is driven in the rotational direction indicated by arrow F in FIG. 1. Provided around each photosensitive drum 222a to 222d, are a primary charger 223a, 223b, 223c and 223d for uniformly charging photosensitive drum 222a–222d, a developing unit 224a, 224b, 224c and 224d for developing the static latent image formed on photosensitive drum 222a–222d, a transfer device 225a, 225b, 225c and 225d for transferring the developed toner image on photosensitive drum 222a–222d to paper P, a cleaning unit 226a, 226b, 226c and 226d for removing the leftover toner from photosensitive drum 222a–222d, in this order with respect to the rotational direction of each photosensitive drum 222a–222d.

Arranged above photosensitive drums 222a to 222d are laser beam scanner units 227a, 227b, 227c and 227d, respectively. Each laser beam scanner unit 227a–227d includes: a semiconductor laser element (not shown) for emitting a beam modulated in accordance with an image data stream; a polygon mirror (deflecting device) 240a–240d for deflecting the laser beam from the semiconductor laser element, in the main scan direction; an f-theta lens 241a–241d for focusing the laser beam deflected by polygon mirror 240a–240d on the surface of photosensitive drum 222a–222d; and mirrors 242a–242d and 243a–243d.

The pixel signal corresponding to the, black component image of a color original image is supplied to laser beam scanner unit 227a; the pixel signal corresponding to the cyan color component image of a color original image is supplied to laser beam scanner unit 227b; the pixel signal corresponding to the magenta color component image of a color original image is supplied to laser beam scanner unit 227c; and the pixel signal corresponding to the yellow color component image of a color original image is supplied to laser beam scanner unit 227d. In this arrangement, the static latent images corresponding to the color separations of the original image information are formed on photosensitive drums 222a to 222d. Developing units 224a, 224b, 224c and 224d hold black toner, cyan color toner, magenta color toner, yellow color toner, respectively. The static latent image on photosensitive drum 222a–222d is developed by the toner of a corresponding color. Thus, the original image information is reproduced as toner images of different colors in image output apparatus 210.

Provided between the first image forming station Pa and paper feeding mechanism 211 is a paper-attraction charger 228, which electrifies the conveyer and transfer belt 216 surface so that paper P fed from paper feeding mechanism 211 can be conveyed without any slip or slide, whilst being reliably attracted to conveyer and transfer belt 216, from the first image forming station Pa to the fourth image forming station Pd.

An erasing device 229 is arranged more or less directly above driving roller 214 located between the fourth image forming station Pd and fixing roller 217. Applied to this erasing device 229 is an alternating current for separating paper P electrostatically attracted to conveyer and transfer belt 216, from the belt.

In the thus configured digital color image forming apparatus, cut-sheet type paper is used as paper P. When paper P is delivered from the paper feed cassette to the guide of the paper conveyance path of paper feeding mechanism 211, the leading edge of paper P is detected by a sensor (not shown), which outputs a detection signal, based on which a pair of registration rollers 212 briefly stops the paper.

Then, paper P is delivered in synchronization with image forming stations Pa to Pd, onto conveyer and transfer belt 216 rotating in the direction of arrow Z in FIG. 1. Meanwhile, conveyer and transfer belt 216 has been charged in a predetermined manner by paper attraction charger 228 as stated above, so that paper P is stably fed and conveyed throughout the passage of all the image forming stations Pa to Pd.

In each image forming station Pa to Pd, the toner image of each color is formed so that the different color images are superimposed on the support surface of paper P which is conveyed whilst being electrostatically attracted by conveyer and transfer belt 216. When transfer of the image formed by the fourth image forming station Pd is completed, paper P is separated by virtue of erasing charger 229, continuously starting at its leading edge, from conveyer and transfer belt 216 and introduced into fixing unit 217. Finally, paper P having the toner image fixed thereon is discharged through the paper discharge port (not shown) onto paper output tray 220.

In the above description, writing to the photosensitive drums is performed by laser beam scanning exposure using laser beam scanner units 227a to 227d. However, instead of the laser beam scanner units, another optical writing system made up of an LED (light emitting diode) array with a focusing lens array may be used. An LED head is smaller in size compared to a laser beam scanner unit and has no moving parts hence is silent. Therefore, this LED head can be preferably used for digital color image forming apparatus of a tandem arrangement type needing multiple optical writing units.

FIG. 2 is a block diagram showing an image processor 10 used in a digital color image forming apparatus as an embodiment of the present invention. Image processor 10 includes: an image input unit 110, an A/D converter 11, a shading correcting portion 12, an input gradation correcting portion 13, a color correcting portion 14, a black character edge judgment portion 15, a black generation/UCR portion 16, a spatial filter 17, a halftone generator 18 and an image output unit 210.

Image input unit 110 is comprised of the aforementioned scanner, for example, which scans an original to capture color image signals (RGB analogue signals) and converts the color image signals into digital signals through A/D (analog/digital) converter 11. Then, shading correcting portion 12 removes a variety of distortions arising through the lighting system, focusing system and image pickup system in image input portion 110. Input gradation correcting portion 13 adjusts color balance and converts the input color image signals into density signals suitable for image processing since the input signals are of reflection coefficient signals (the signals proportional to the amounts of light emitted from the exposure lamp and reflected from the original).

Next, color correcting portion 14 removes color turbidness in order to realize exact color reproduction. Black generation/UCR portion 16 performs such a process as to reproduce the color image with four colors, i.e., CMYK. During this process, in order to achieve improved reproducibility of black characters in an original having both characters and photographs mixed therein, black character edge judgment portion (edge detecting means) 15 detects black character edges and also makes an emphasis setup judgment, based on the predetermined criteria. This will be detailed later. The results are output to black generation/UCR portion 16, spatial filter 17, halftone generator 18, whereby black character edges are subjected to a suitable emphasis process. The signals thus processed are supplied to image output unit 210 where an image is reproduced on a recording medium.

Figure 3:
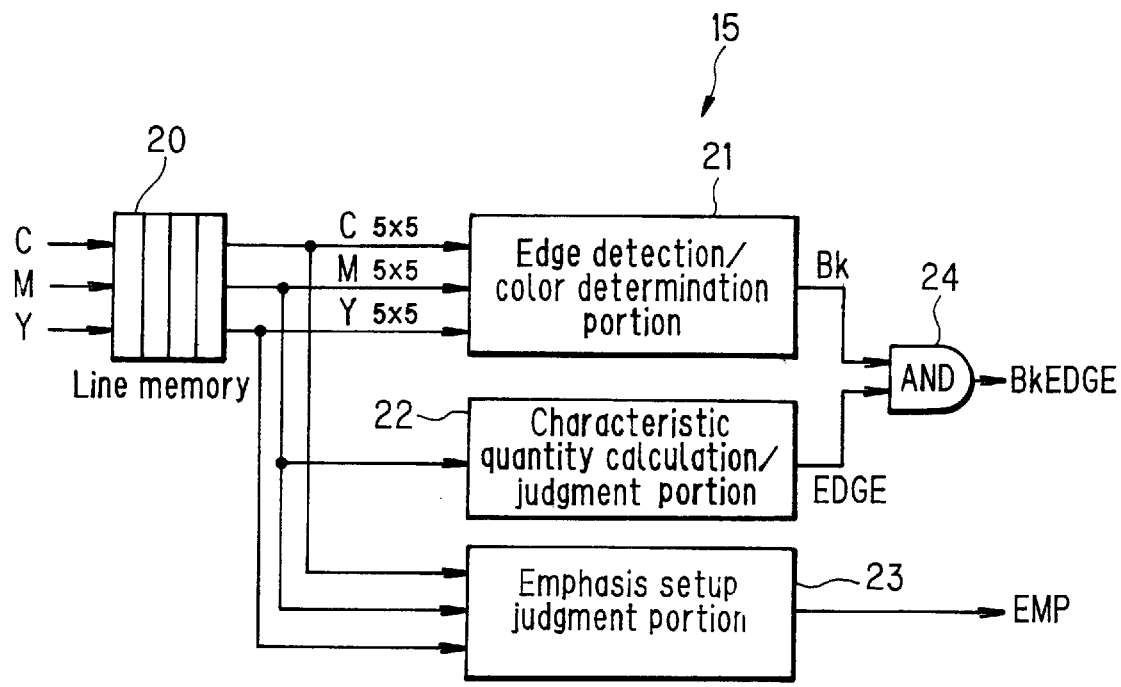
FIG. 3 is a block diagram showing a configuration of a black character edge judgment portion.
Figure 4:
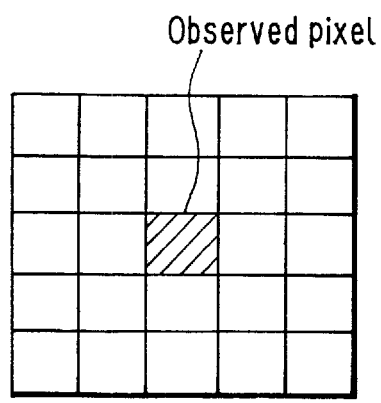
FIG. 4 is a diagram showing a 5×5 mask having an observed pixel at the center thereof for use in a black character edge judgment portion.

FIG. 3 is a block diagram showing a configuration of black character edge judgment portion 15. This black character edge judgment portion 15 is basically composed of an edge detection/color determination portion 21, a characteristic quantity calculation/judgment portion 22 and an emphasis setup judgment portion 23. To begin with, a 5×5 mask having an observed pixel at the center thereof shown in FIG. 4 is produced from the input image data (CMY signals) after color correction using a four-line memory 20, and this mask is supplied to the necessary portions. In this embodiment, a 5×5 mask is formed but the mask size should not be limited to this.

Edge detection/color determination portion 21 detects an edge using a Sobel filter and determines the color, to thereby produce a black edge judgment signal Bk. Characteristic quantity calculation/judgment portion 22 calculates the characteristic quantities in the mask and determines if the observed pixel is of a character's edge, to thereby output a character edge judgment signal EDGE. An AND circuit 24 outputs the logical product between both the signals as a black character edge judgment signal BkEDGE. Emphasis setup judgment portion 23 determines whether the emphasis process will cause white voids and/or contours around characters and outputs an emphasis setup judgment signal EMP.

Now, these three processes will be described in detail.

Figure 5:
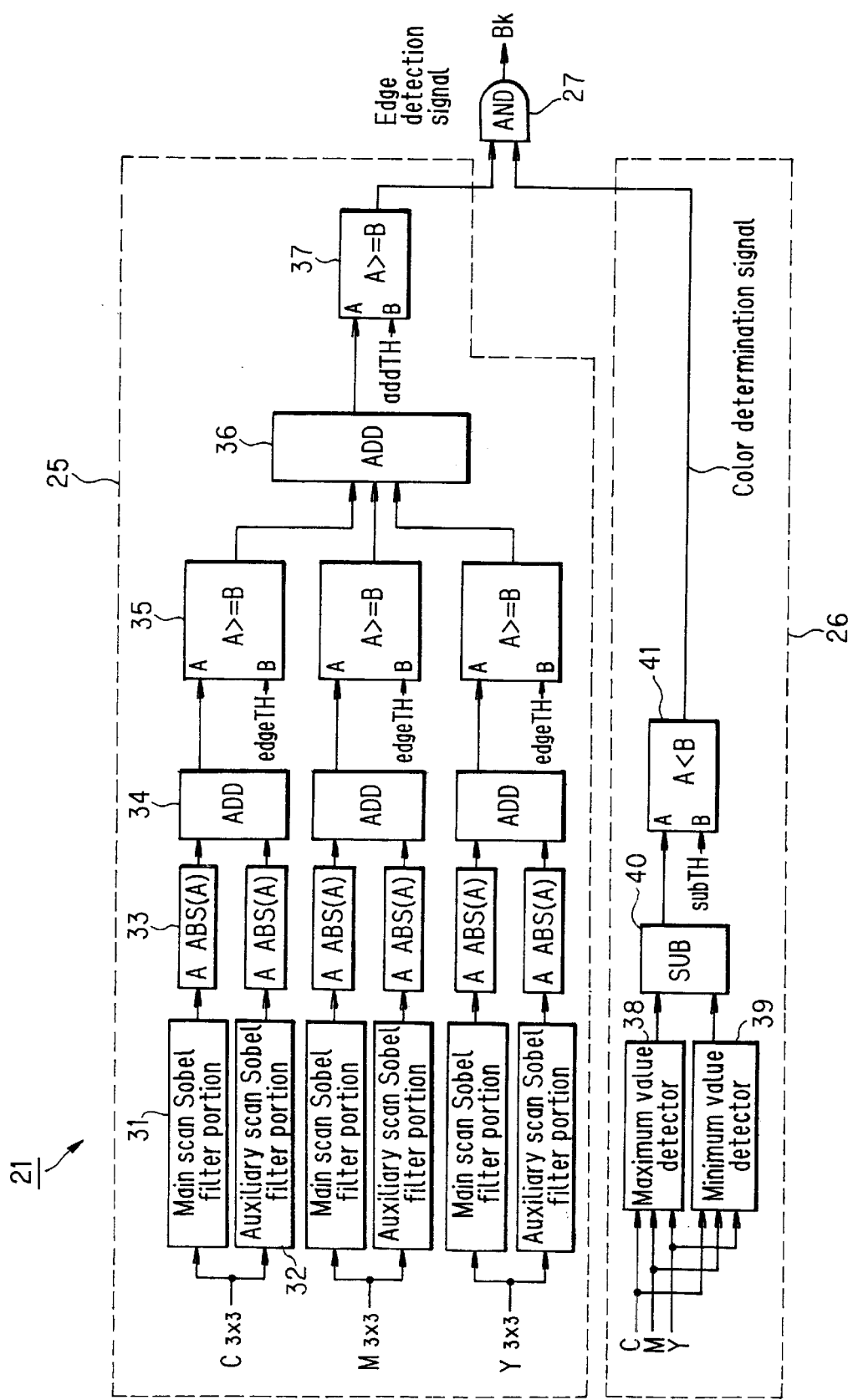
FIG. 5 is a block diagram showing a configuration of an edge detection/color determination portion.
Figures 6, 7, 8:
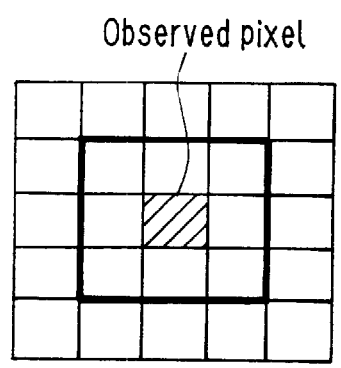
FIG. 6 is a diagram showing a 3×3 mask having an observed pixel at the center thereof for use in an edge detection/color determination portion.
FIG. 7 is an example of a Sobel filter for the main scan direction used in the processing of an edge detection/color determination portion.
FIG. 8 is an example of a Sobel filter for the auxiliary scan direction used in the processing,of an edge detection/color determination portion.

FIG. 5 shows a configuration of edge detection/color determination portion 21. With reference to this figure, the process flow of edge detection and color determination will be explained. Edge detection/color determination portion 21 is configured of an edge detection circuit 25 and a color determination circuit 26 and an AND circuit 27. First, edge detection circuit 25 will be described. A 5×5 mask having an observed pixel at the center thereof is read out from line memory 20. From this mask, a 3×3 pixel mask having the observed pixel at the center thereof (FIG. 6) is extracted and is input to a main scan-directional Sobel filter portion 31 and an auxiliary scan-directional Sobel filter portion 32. In main scan-direction Sobel filter portion 31,. the 3×3 pixel mask is processed through a main scan-direction Sobel filter shown in FIG. 7 while the mask is processed through an auxiliary scan-directional Sobel filter shown in FIG. 8 in auxiliary scan-directional Sobel filter portion 32. From the filtered result of the observed pixel through each Sobel filter, its absolute value is determined through each absolute value calculating portion (ABS) 33. The thus determined absolute values are summed by an adder (ADD) 34. The reason the absolute values are used is that the Sobel filters include negative coefficients. The reason for the summation is to consider the results with respect to both the main scan direction and the auxiliary scan direction.

The sum of the values for both directions is input to a subsequent comparator 35, where it is compared to a threshold 'edgeTH'. Comparator 35 outputs '1' if the sum is equal to or greater than threshold 'edgeTH' and '0' otherwise. The above operation is effected for each of the colors C, M and Y. The output signals for three colors of the observed pixel are summed by an adder (ADD) 36, then the sum is compared to a threshold 'addTH' at a comparator 37, which in turn outputs an edge detection signal, that is, '1' if the observed pixel is of an edge and '0' otherwise. For example, if an observed pixel is determined to be of an edge only when all the three color components of the observed pixel show edge features, threshold 'addTH' is set at 3, while if an observed pixel may be determined to be of an edge when one color component of the observed pixel shows edge features, threshold 'addTH' may be set at 1.

In color determination circuit 26, a maximum value detecting portion 38 and minimum value detecting portion 39 detect the maximum and minimum values of the C, M and Y components for each observed pixel. A subtracter (SUB) 40 determines differences. Then the results are compared in comparator 41 to a threshold 'subTH' so as to judge whether the observed pixel is chromatic or achromatic. That is, when the differential values between C, M and Y as to an observed pixel are greater than a predetermined level (threshold 'subTH'), the observed pixel is determined to be chromatic, while the pixel is determined to be achromatic otherwise. By this operation, '1' is output as the color determination signal if the observed pixel is determined to be achromatic (black), and otherwise, '0' is output.

The edge detection signal and color determination signal output from the above processes are supplied to AND circuit 27 which outputs their logical product, which is the black edge judgment signal Bk. To sum up, only the pixels which are detected as being of an edge and which are determined to be black from the color determination result are determined as black edge pixels.

Figure 9:
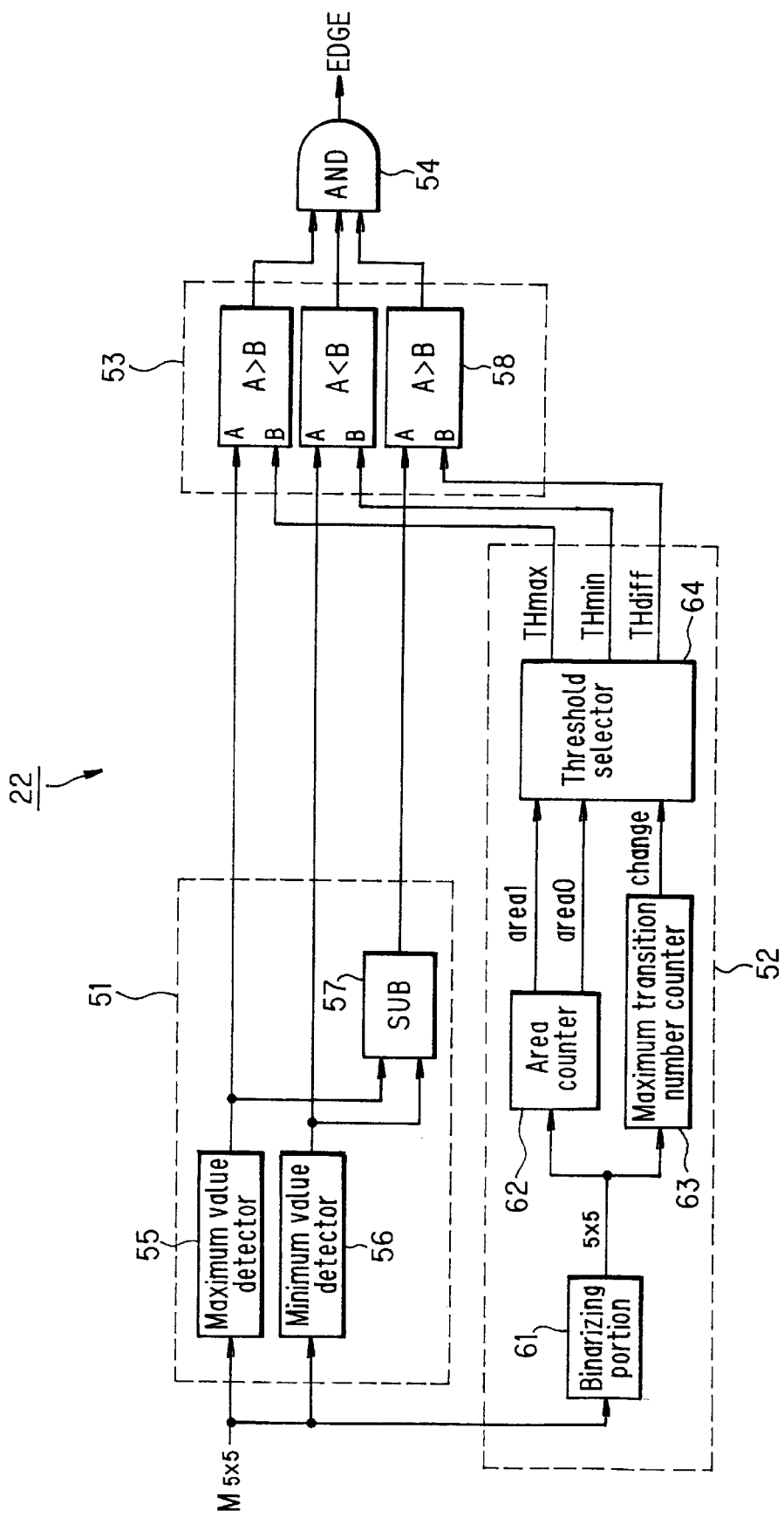
FIG. 9 is a block diagram showing a configuration of a characteristic quantity calculation/judgment portion.

FIG. 9 shows the process flow of characteristic quantity calculation/judgment portion 22. Characteristic quantity calculation/judgment portion 22 includes a first characteristic quantity calculating circuit 51, a second characteristic quantity calculating circuit 52, a judging circuit 53 and an AND circuit 54. In this embodiment, only the M signal is used for the judgment, but the reference signal should not be limited to the M signal.

In first characteristic calculating circuit 51, a maximum value detecting portion 55 detects the maximum density from the 5×5 mask that is read out from line memory 20 and a minimum value detecting portion 56 detects the minimum density. A subtracter (SUB) 57 calculates the difference. (maximum differential density). These values, i.e., the maximum density, minimum density and maximum differential density are compared to respective thresholds THmax, THmin and THdiff, in different comparators 58 of a judging circuit 53 located downstream. The compared results are supplied to AND circuit 54 where their logical product is determined. The AND circuit outputs a signal representing '1' if the pixel is of a character edge while it outputs '0' otherwise. This signal is the character edge judgment signal EDGE.

The three thresholds THmax, THmin and THdiff used in the above judgment are determined based on the characteristic quantities calculated from the 5×5 mask by second characteristic quantity calculating circuit 52.

In general, if the characters on an original have the same density, the density values captured through the CCD will differ depending upon the character size. Under this consideration, the thresholds THmax, THmin and THdiff are switched based on the character size. As the characteristic quantities for switching the thresholds THmax, THmin and THdiff, the areas of the pixels and the number of state-transitions in the 5×5 mask when the pixels values in the 5×5 mask have been binarized. So, first of all, the pixel values in the 5×5 mask are binarized through a binarizing portion 61.

Figure 10:
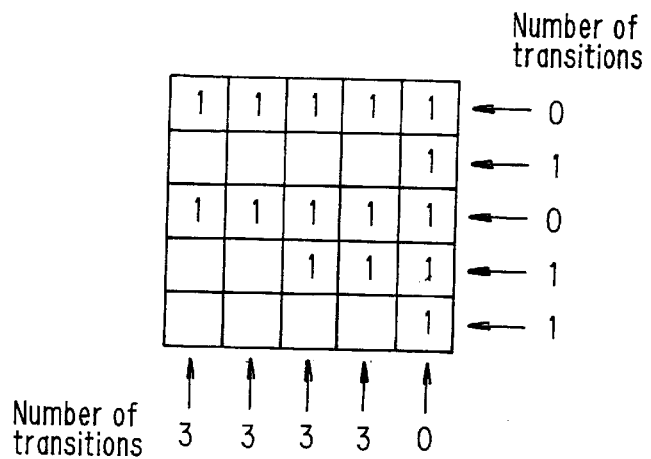
FIG. 10 is an example of a binary mask used in the processing of a characteristic quantity calculation/judgment portion.

For example, if the density of a pixel is greater than the average density in the mask, the pixel value is set at '1', otherwise set at '0' to obtain a binarized mask. If a character is present on a low-density background, the character area corresponds to '1' and the background area corresponds to '0'. Next, from this binarized mask, the areas and the maximum number of state-transitions are determined. The calculation of the areas is carried out by an area counter 62, which counts and outputs the number of pixels having a value of '1' in the binary mask as 'area1' and the number of pixels having a value of 'O' as 'area0'. The maximum number of state-transitions are determined by a maximum transition number counter 63, which counts the number of transitions between '1' and '0' in each line with respect to the main and auxiliary scan directions and outputs the maximum of all as 'change'. For example, in a binary mask shown in FIG. 10, area1=15, area0=10 and change=3.

Based on these three characteristic quantities 'area1', 'area0' and 'change', a threshold selector 64 switches the values of the above thresholds THmax, THmin and THdiff.

Figure 11:
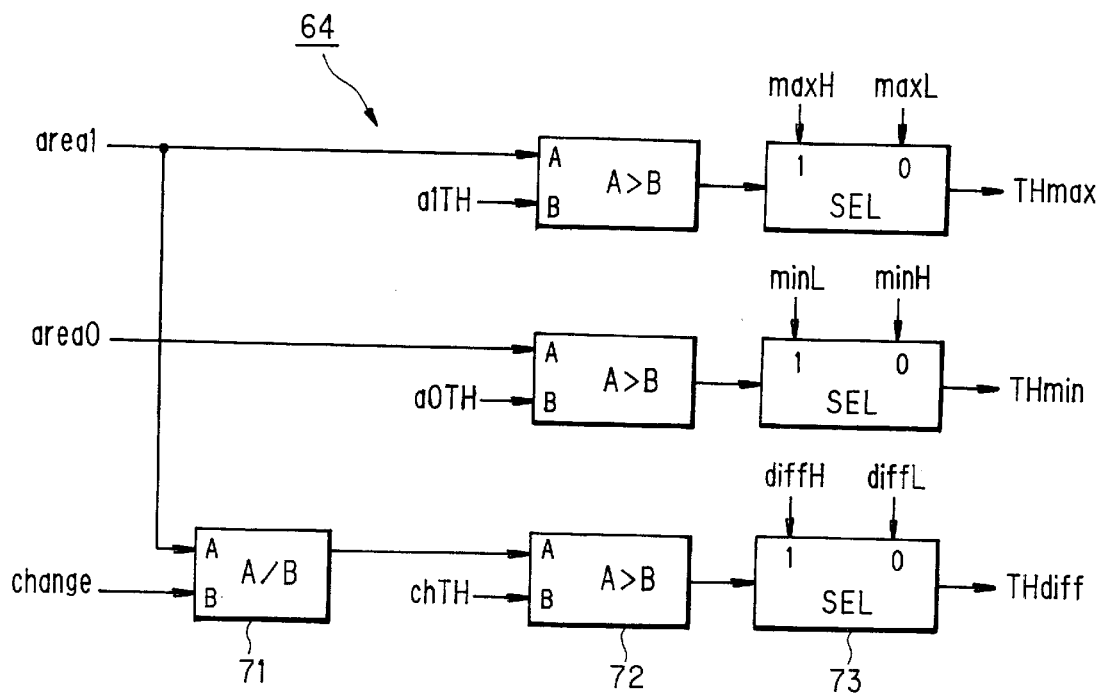
FIG. 11 is a block diagram showing a configuration of a threshold selector as a part of a characteristic quantity calculation/judgment portion.

FIG. 11 shows the processing flow in this threshold selector 64. In this example, each selector 73 has two values set beforehand, i.e. strict and relaxed values. More specifically, threshold selector 73 for maximum density has two values, [maxH and maxL], threshold selector 73 for minimum density has two values, [minL and minH], and threshold selector 73 for maximum differential density has two values, [diffH and diffL]. Located upstream of selectors 73 are comparators 72, which compare 'area1', 'area0' and the quotient of the number of pixels having a value of '1' in the binary mask 'area1' by the maximum transition number 'change' (calculated by a divider (A/B) 71), with predetermined thresholds a1TH, a0TH and chTH, respectively.

Now, the selecting method of thresholds THmax, THmin and THdiff will be described. When the character area, i.e., 'area1' is, to a certain degree, large (area1>a1TH), the maximum density can be detected easily, so that the strict threshold 'maxH' is selected as THmax by selector 73, otherwise, the relaxed threshold 'maxL' is selected. When the background area 'area0' is, to a certain degree, large (area0>a0TH), the minimum density can be detected easily, so that the strict threshold 'minL' is selected as THmin by selector 73, otherwise, the relaxed threshold 'minH' is selected. For small characters, area 'area1' is small and the maximum transition number 'change' is large. Conversely, for large characters, area 'area1' is large and the maximum transition number 'change' is small. Therefore, when the quotient of area '1' by the maximum transition number 'change' is, to a certain degree, large [(area1/change) >chTH], the maximum differential density can be detected easily. Hence, the strict threshold 'diffH' is selected as THdiff by selector 73, otherwise, the relaxed threshold 'diffL' is selected.

As has been described, based on the characteristic quantities of the binary mask, the three thresholds THmax, THmin and THdiff are selected. In this embodiment, two levels, i.e., the strict threshold and relaxed threshold are given, but three or more levels can of course be given for the selection.

Figure 12:
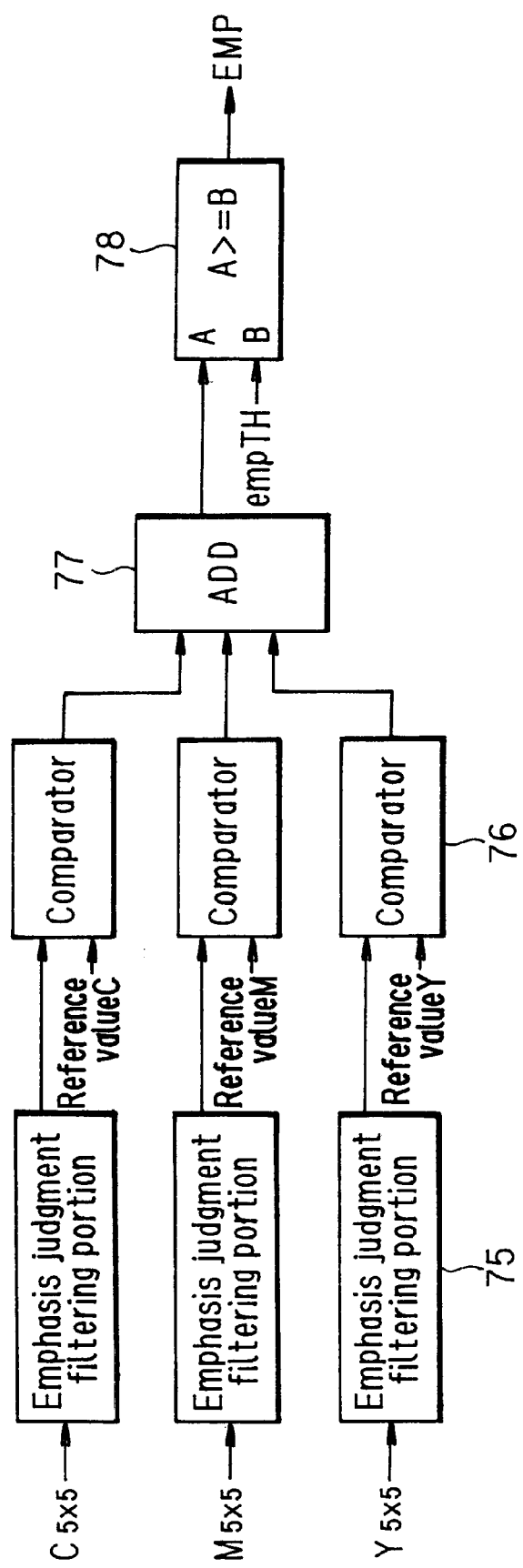
FIG. 12 is a block diagram showing a configuration of an emphasis setup judgment portion.

FIG. 12 shows the processing flow of emphasis setup judgment portion 23. In general, in a case where there is a black character on the background of a low density as shown in FIG. 13A, emphasis filtering is effected on the whole black character edges, white voids and contours of a lower density than that of the background arise around characters as shown in FIG. 13B. In order to avoid this, emphasis setup judgment is performed. First, the 5×5 masks of C, M and Y color components, are read out from line memory 20 and input to respective emphasis judgment filtering portions (emphasis judgment filtering means) 75. For example, each mask is processed through an emphasis judgment filter shown in FIG. 14. The emphasis judgment filter used here is one of emphasis filters, and will not be limited to that shown in FIG. 14.

Figure 15A:
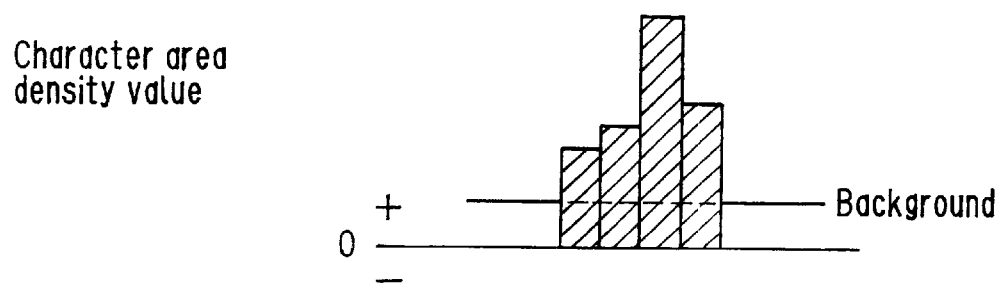
FIG. 15A is a chart showing a density distribution in a character area.
Figure 15B:
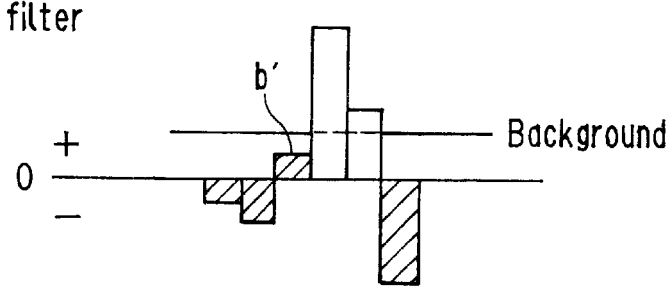
FIG. 15B is a chart showing a density distribution resulting from an emphasis judgment filtering process on that shown in FIG. 15A.

FIG. 15A shows density values in a character area and FIG. 15B shows the density values resulting from an emphasis judgment filtering operated on that shown in FIG. 15A. A character area having a density distribution shown in FIG. 15A is filtered through an emphasis judgment filter, negative values may appear at the character edges in the resultant distribution as shown in FIG. 15B. The areas presenting negative values after processing through a certain type of emphasis filter, can produce white voids around characters. Accordingly, such areas should be detected beforehand so as to prevent white voids from occurring. Further, since color blurring often occurs at black character edges, replacement of the data of these areas with data close to black enables avoidance of the disappearance of small characters and fine lines.

For each color component C, M and Y the resultant values in the 5×5 mask after filtering through the emphasis judgment filter are supplied to a comparator (comparing means) 76, where the values are compared to a reference value (reference value C, reference value M and reference value Y). If the data is greater than the reference value, the comparator outputs '1', and otherwise, it outputs '0'. As an example, the above reference value may be set at '0'. This setting means that the sign of the resultant value after filtering through the emphasis judgment filter is used as a judgment indicator. In this way, when the sign, i.e., positive or negative, of the value is used for the judgment, it is possible to avoid occurrence of white voids around characters. Alternatively, the background density value (background data) may be used as the reference value. As the background density, the minimum value of each color in the 5×5 mask may be used for instance. When the background density value is used as the reference value, it is possible to avoid not only white voids but also occurrence of contours having a lower density value than that of the background (corresponding to b' in FIG. 15B). Otherwise, even if the sign of the data values after the emphasis judgment filtering process is positive, uniform emphasis of the areas having lower densities than the background density would produce contours around characters.

The comparison results of different colors are summed by an adder(ADD) 77 so as to determine the characteristic quantity of the observed pixel. This characteristic quantity is compared to a threshold empTH at a comparator (signal generating means) 78, which in turn outputs emphasis setup judgment signal EMP having a value of either '0' or '1'. The above threshold empTH is set at '3' because the emphasis process should be effected only when all the values for the three colors are determined to be greater than corresponding reference values. The pixels presenting EMP=1 may be subjected to the emphasis process, whereas the pixels having EMP=0 may produce white voids, contours and color blurring if they are emphasized.

Black character edge judgment portion 15 effects the processing described heretofore and outputs black character edge judgment signal BkEDGE and emphasis setup signal EMP. As shown in FIG. 2, these signals are supplied to black generation/UCR portion 16, spatial filter portion 17 and halftone generator 18 so that each portion executes an appropriate treatment on black characters.

Figure 16:
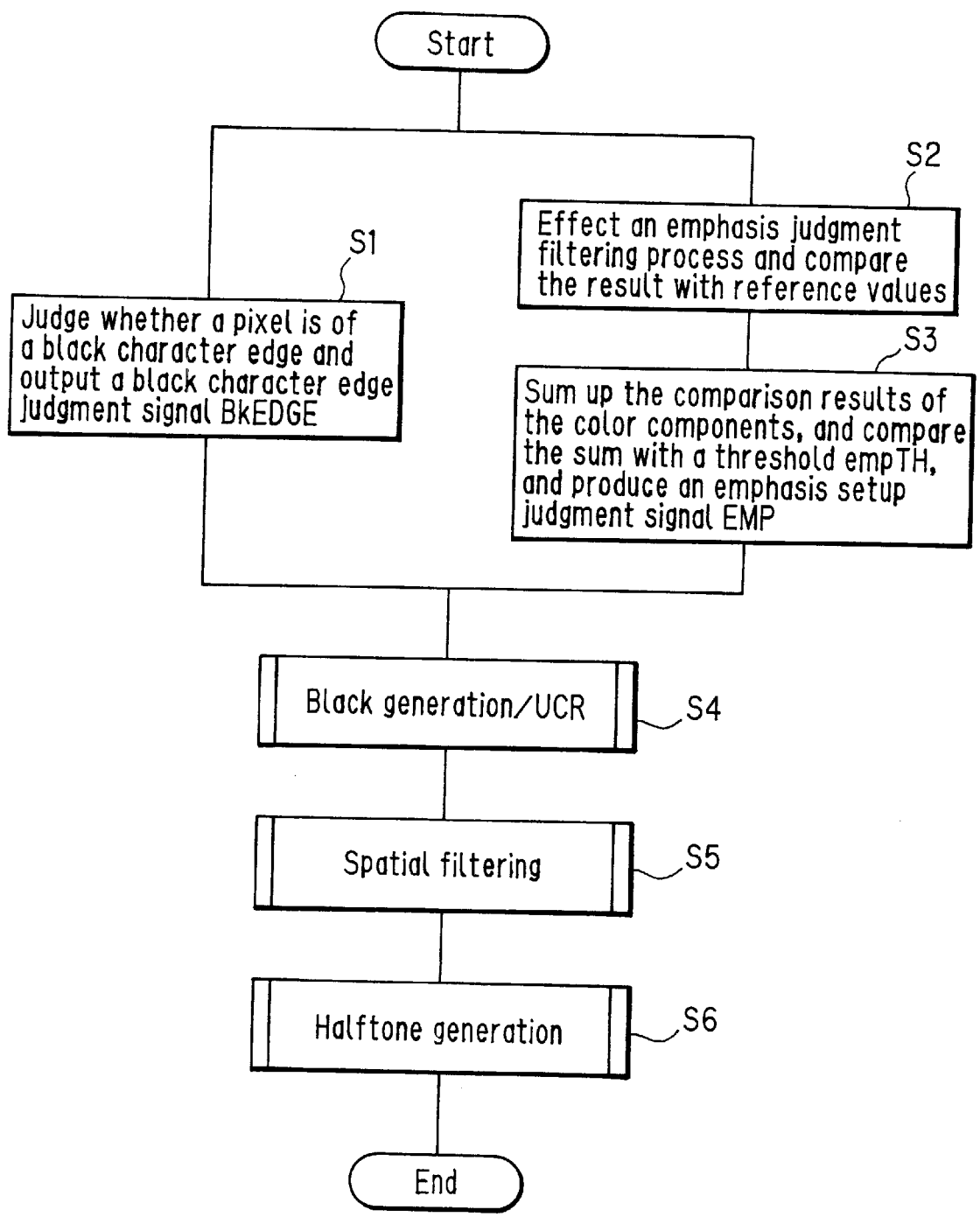
FIG. 16 is a flowchart for illustration of performing an image processing with reference to a black character edge judgment signal and an emphasis setup judgment signal.

FIG. 16 shows the flow of the processing.

First, at step 1 (step will be abbreviated hereinbelow as S), in edge detection/color determination portion 21 and characteristic quantity calculation/judgment portion 22 in black character edge judgment portion 15, the black character edge judgment process is effected for each observed pixel to produce black character edge judgment signal BkEDGE. In parallel with this black character edge judgment process, emphasis setup judgment portion 23 makes an emphasis setup judgment for the observed pixel. In this judgment, each color component of the observed pixel that has been processed through the emphasis judgment filter at S2 is compared with the reference value determined for the color. These comparison results are summed and the sum is compared with threshold empTH to thereby produce emphasis setup judgment signal EMP (S3). Based on these black character edge judgment signal BkEDGE and emphasis setup judgment signal EMP, black generation/UCR is effected first at S4, being followed by spatial filtering process (S5) and halftone generating process (S6).

Figure 17:
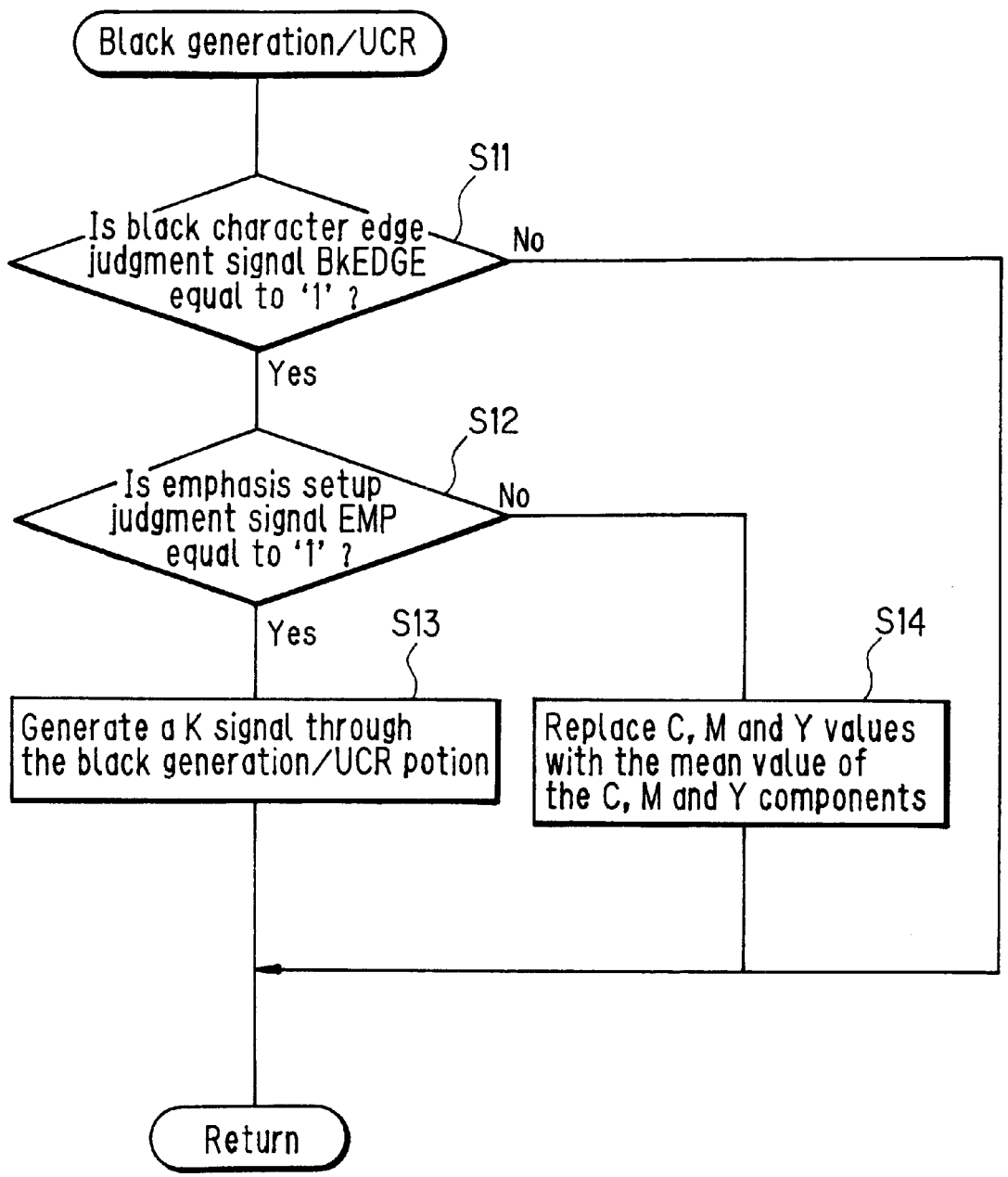
FIG. 17 is a flowchart showing a black generation/UCR process.
Figure 18:
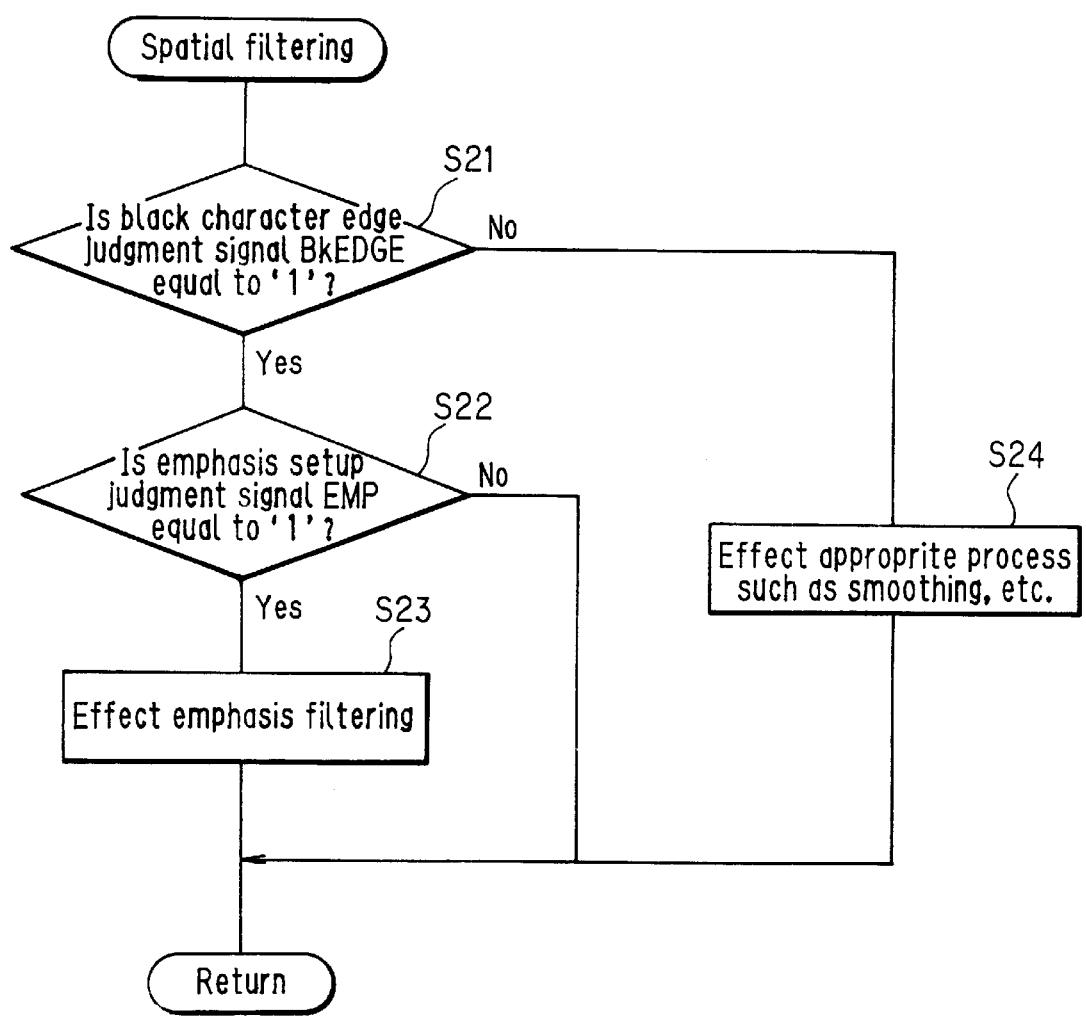
FIG. 18 is a flowchart showing a spatial filtering process.

Next, the detailed contents of the procedures from S4 to S6 will be described with reference to Figs. 17 to 19.

Black generation/UCR portion 16 performs black generation in which the minimum density is detected from the color corrected C, M and Y signals and a K(black) signal is generated based on the detection and then undercolor removal is performed in which new C, M and Y signals are generated by subtracting the K signal from the original C, M and Y signals. As shown in FIG. 17, at S11, it is judged whether black character edge judgment signal BkEDGE is '1'. If BkEDGE=1, then emphasis setup judgment signal EMP is checked at S12. When it is found that EMP=1 at S12, then BkEDGE=1 and EMP=1, which indicates that the observed pixel is of a black edge, so that black generation/UCR is effected (S13).

When it is determined that EMP=0 at S12, then BkEDGE=1 and EMP=0, which indicates that the observed pixel belongs to an area which might produce a white void, contour or color blurring if it is emphasized then, in this case, the C, M and Y values are replaced by their mean value (S14). This replacement with the mean value is to eliminate the density differences between C, M and Y and make the resultant color closer to an achromatic color (black). By this configuration, it is possible to enhance black characters whilst preventing color blurring around characters. The above replacement process is effected in an unillustrated signal replacing means provided for black generation/UCR portion 16. For the pixels which have been determined as BkEDGE=0, no particular process will be effected.

Next, the spatial filtering process at S5 will be described. In spatial filter portion 17, for example, character areas are processed through a high-pass emphasis filter to sharpen the characters. In FIG. 18, first, black character edge judgment signal BkEDGE is checked at S21. When the result is found to be '1', emphasis setup judgment signal EMP is checked (S22). Here, if EMP=1, then the emphasis filtering process is effected at S23. If EMP=0, then this process will not be effected. Since a pixel of which BkEDGE has been determined to be '0' at S21 is not of a black character, the pixel will be subjected to an appropriate process, such as smoothing etc., that is suitable for the features of the pixel.

By the above process, it is possible to perform appropriate emphasis filtering of character edges whilst preventing occurrence of white voids and contours around characters. For halftone generation, in order to reproduce a final image, an image is segmented into pixels, which are systematically tethered so as to reproduce continuous tones.

Figure 19:
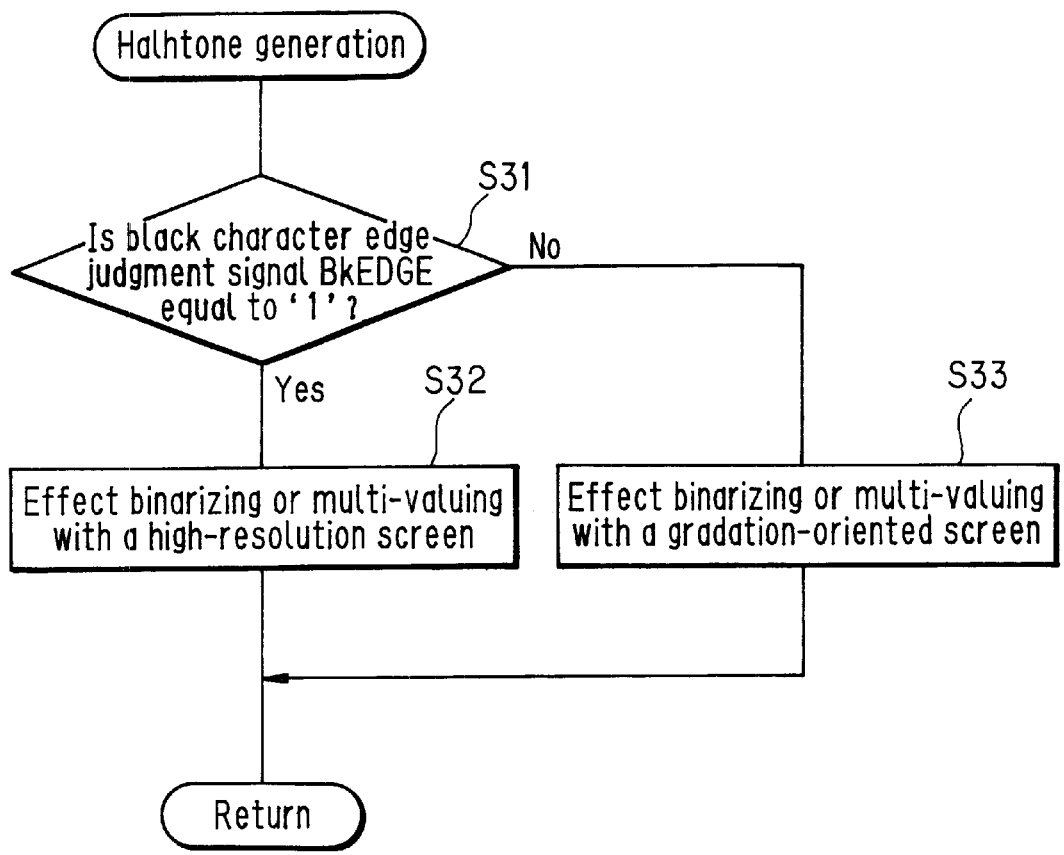
FIG. 19 is a flowchart showing a halftone generating process.

For halftone generation, as shown in FIG. 19, only black character edge judgment signal BkEDGE is checked without checking emphasis setup judgment signal EMP to determine the mode of halftone generation. At S31, if BkEDGE=1, then at S32 the area is binarized or multi-valued using a high-resolution screen. If BkEDGE=0, then at S33 the area is binarized or multi-valued using a screen which put importance on the reproducibility of continuous tones.

Thus, the above configuration of processing makes it possible to effect halftone generation that is suitable for both the character areas and the other areas including photographs etc.

In this way, when black generation/UCR, spatial filtering, halftone generation have been completed with reference to black character edge judgment signal BkEDGE and emphasis setup judgment signal EMP, the operation sequence is ended, whereby an image is output from image output unit 210.

As has been described heretofore, the image processing method according to the above first feature of the present invention comprises the steps of: subjecting a plurality of color components constituting color image input data to an emphasis judgment filtering process; comparing each result with a corresponding predetermined reference value and summing the compared results; comparing the sum with a predetermined threshold; judging whether an emphasis process is effected for the color image input data based on the comparison; and replacing the color image input data with achromatic color data when the judgment determines that the emphasis process should not be effected.

Therefore, this method is effective in emphasizing black characters in an appropriate manner whilst avoiding occurrence of white voids and color blurring around black character edges and disappearance of small characters and thin lines.

The image processing method according to the above second feature of the present invention is a method having the above first feature wherein the achromatic color data is the mean value of the multiple color components of the color image input data.

Therefore, this method is effective in generating achromatic color data promptly in a simple way.

The image processing method according to the above third feature of the present invention is a method having the above first feature wherein the reference value is determined based on the background data of the color image input data.

Since in the above method, areas in which contours around characters would appear are detected beforehand and the emphasis process is effected excluding such areas, it is possible to prevent contours having a lower density than that of the background from arising around characters even when black characters are present in a background of a low density. Thus, the present method is effective in effecting appropriate emphasis on black characters.

The image processing apparatus according to the above fourth feature of the present invention has an edge detecting means for detecting edges of black characters based on color image input data, and further comprises: an emphasis judgment filtering means for subjecting a plurality of color components constituting color image input data to an emphasis judgment filtering process; a comparing means for comparing the result as to each color component output from the emphasis judgment filtering means, with a corresponding predetermined reference value; a signal generating means for generating an emphasis setup judgment signal based on the result from the comparing means; and a signal replacing means for replacing the color image input data with achromatic color data when the judgment determines that the emphasis process should not be effected.

Therefore, the above configuration is effective in emphasizing black characters in an appropriate manner whilst avoiding occurrence of white voids and color blurring around black character edges and disappearance of small characters and thin lines.

The image processing apparatus according to the above fifth feature of the present invention is a configuration having the above fourth feature wherein the signal replacing means calculates the mean value of the multiple color components of the color image input data as the above achromatic color data and replaces the values of each color component with the achromatic color data.

Therefore, the above configuration is effective in generating achromatic color data by simple arithmetic operations.

As above, the image processing apparatus according to the above sixth feature of the present invention is a configuration having the above fourth feature wherein the reference values set up in the comparing means are determined based on the background information of the color image input data.

Since in the above configuration, areas in which contours around characters would appear are simply detected and the emphasis process is effected excluding such areas, it is possible to prevent contours having a lower density than that of the background from arising around characters even when black characters are present on a background of a low density. Thus, the present method is effective in effecting appropriate emphasis on black characters.

What is claimed is:

1. An image processing method, comprising the steps of:
    subjecting a plurality of color components constituting color image input data to an emphasis judgment filtering process;
    comparing each result with a corresponding predetermined reference value and summing the compared results;
    comparing the sum with a predetermined threshold;
    judging whether an emphasis process is effected for the color image input data based on the comparison; and
    replacing the color image input data with achromatic color data when the judgment determines that the emphasis process should not be effected.

2. The image processing method according to claim 1, wherein the achromatic color data is the mean value of the multiple color components of the color image input data.

3. The image processing method according to claim 1, wherein the reference value is determined based on the background data of the color image input data.

4. An image processing apparatus at least having an edge detecting means for detecting edges of black characters based on color image input data, comprising:
    an emphasis judgment filtering means for subjecting a plurality of color components constituting color image input data to an emphasis judgment filtering process;
    a comparing means for comparing the result as to each color component output from the emphasis judgment filtering means, with a corresponding predetermined reference value;
    a signal generating means for generating an emphasis setup judgment signal based on the result from the comparing means; and,
    a signal replacing means for replacing the color image input data with achromatic color data when the judgment determines that the emphasis process should not be effected.

5. The image processing apparatus according to claim 4, wherein the signal replacing means calculates the mean value of the multiple color components of the color image input data to produce achromatic color data and replaces the color image input data with the achromatic color data.

6. The image processing apparatus according to claim 4, wherein the reference values set up in the comparing means are determined based on the background information of the color image input data.

\* \* \* \* \*